(12) United States Patent
Wurtenberger et al.

(10) Patent No.: US 9,249,921 B1
(45) Date of Patent: Feb. 2, 2016

(54) RAISING AND LOWERING TELECOMMUNICATIONS EQUIPMENT ON A TELECOMMUNICATIONS TOWER

(71) Applicant: Sprint Communications Company L.P., Overland Park, KS (US)

(72) Inventors: Andrew Mark Wurtenberger, Olathe, KS (US); Joshua Torey Koenig, Lawrence, KS (US); Sreekar Marupaduga, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 404 days.

(21) Appl. No.: 13/708,617

(22) Filed: Dec. 7, 2012

(51) Int. Cl.
*H01Q 1/12* (2006.01)
*F16M 11/18* (2006.01)

(52) U.S. Cl.
CPC .............. *F16M 11/18* (2013.01); *H01Q 1/1207* (2013.01)

(58) Field of Classification Search
CPC ....... H01Q 1/1207; H01Q 1/12; H01Q 1/125; H01Q 1/088; H01Q 1/1242; H01Q 1/247
USPC ................ 248/125.2, 332, 334.1, 162.1, 565; 254/263, 270, 329, 335, 336, 337, 338; 343/878, 890, 891
See application file for complete search history.

(56) References Cited

U.S. PATENT DOCUMENTS

| | | | | |
|---|---|---|---|---|
| 4,356,498 A * | 10/1982 | Pollard | ......................... | 343/890 |
| 4,607,389 A * | 8/1986 | Halgrimson | ................. | 455/11.1 |
| 6,658,797 B2 * | 12/2003 | Jones | ................. | 52/40 |
| 8,125,403 B2 * | 2/2012 | Hager | ......................... | 343/890 |
| 8,373,612 B2 * | 2/2013 | Cook | ......................... | 343/890 |
| 8,624,793 B2 * | 1/2014 | Caldwell et al. | ............. | 343/890 |

* cited by examiner

Primary Examiner — K Wood

(57) ABSTRACT

A system for raising and lowering telecommunications equipment on a telecommunications tower includes various elements. For example, the system might include a tower wall that circumscribes an interior hollow space. In addition, the system might include a track that extends from a bottom of the tower through the interior hollow space and that allows telecommunications equipment to be transported between the bottom and an operational position on the tower.

16 Claims, 5 Drawing Sheets

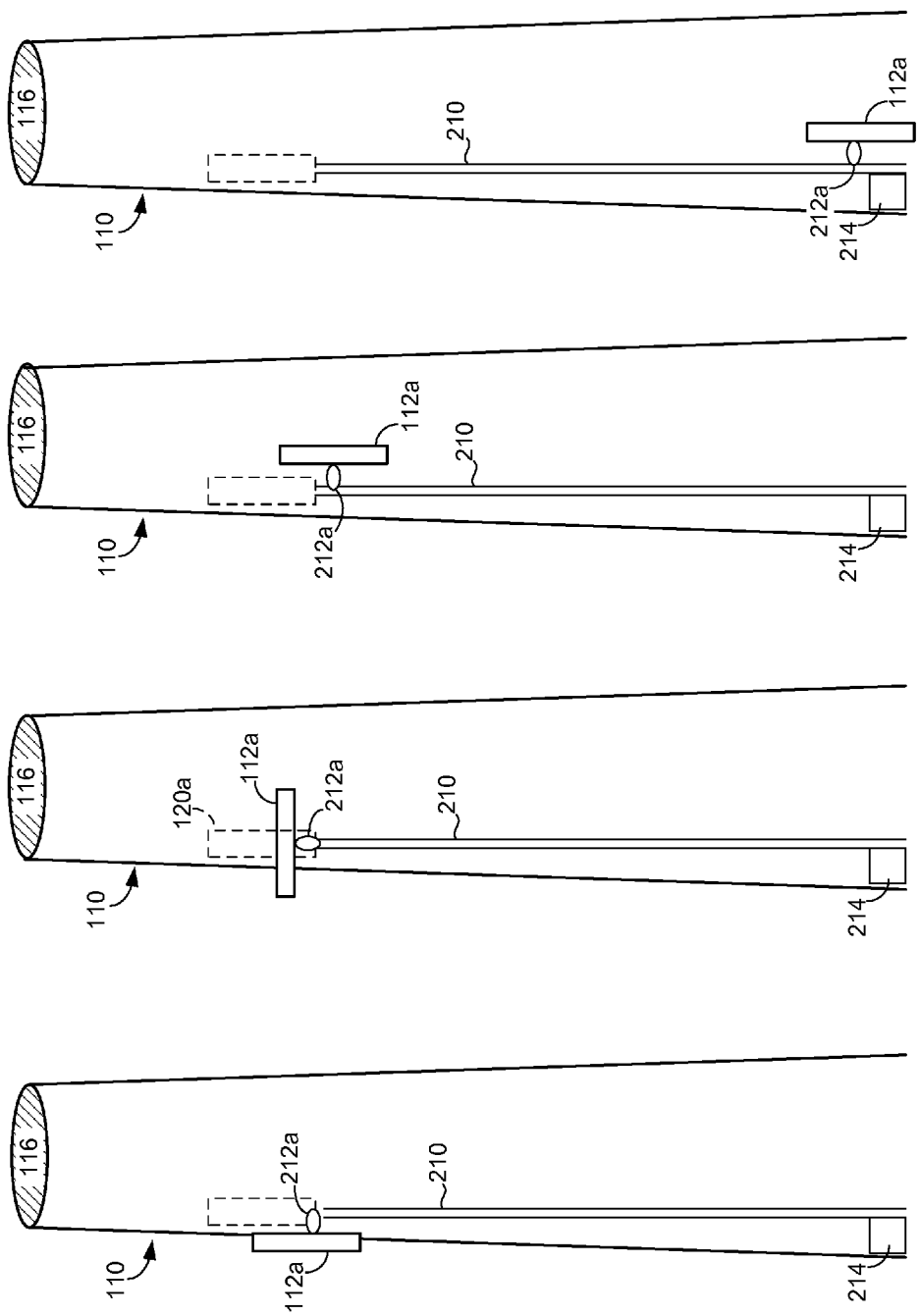

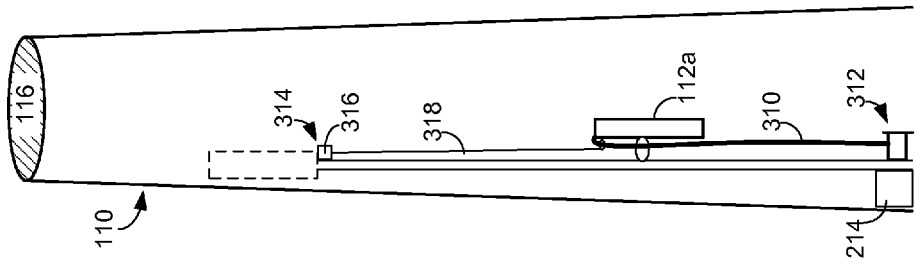
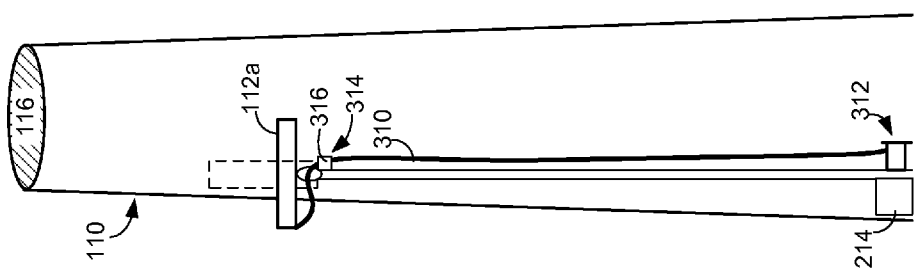
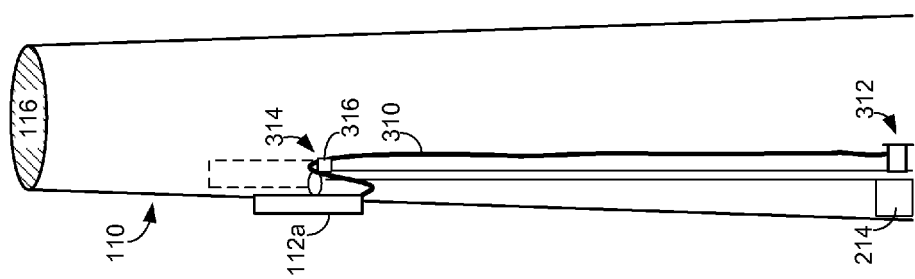

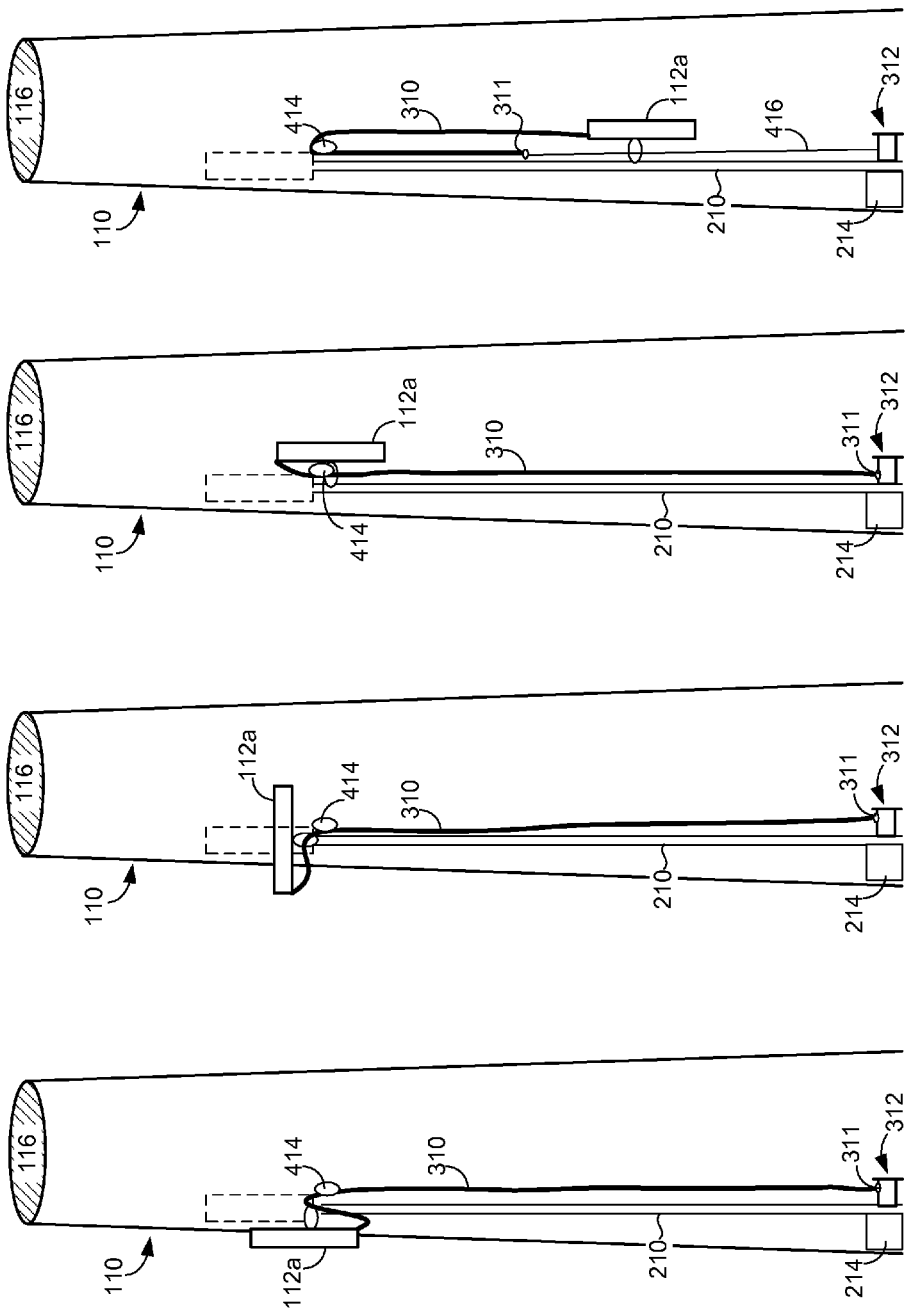

RAISING AND LOWERING TELECOMMUNICATIONS EQUIPMENT ON A TELECOMMUNICATIONS TOWER

SUMMARY

In brief, and at a high level, this disclosure describes, among other things, raising and lowering telecommunications equipment on a telecommunications tower. For example, the tower might include a hollow internal space in which a track is positioned. The track might be used to transport telecommunications equipment between the bottom of the tower and an operational position of the equipment.

Embodiments of the invention are defined by the claims below, not this summary. This summary merely provides a high-level overview of various aspects of the invention and introduces a selection of concepts that are further described in the detailed-description section below. This summary is not intended to identify key features or essential features of the claimed subject matter, nor is it intended to be used as an aid in isolation to determine the scope of the claimed subject matter.

BRIEF DESCRIPTION OF THE DRAWINGS

Illustrative embodiments of the present invention are described in detail below with reference to the attached drawing figures, which are incorporated herein by reference, wherein:

FIGS. 2A-2D each depict telecommunications equipment at a respective position relative to a telecommunications tower and a track in accordance with an embodiment of the present invention;

FIGS. 3A-3D each depict telecommunications equipment at a respective position relative to a telecommunications tower and a cable of the telecommunications equipment in accordance with an embodiment of the present invention;

FIGS. 4A-4D each depict telecommunications equipment at a respective position relative to a telecommunications tower and a cable of the signaling component in accordance with an embodiment of the present invention.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps, combinations of steps, or elements similar to the ones described in this document, in conjunction with other present or future technologies.

Figure 1A:
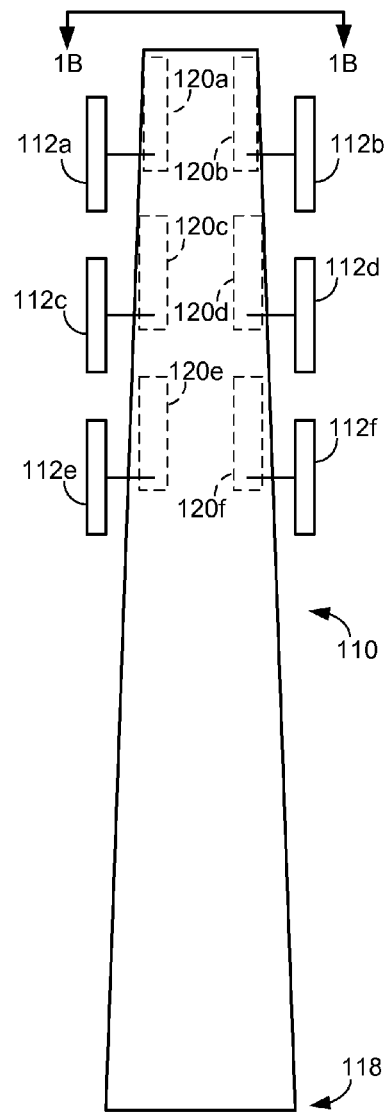
FIG. 1A depicts a side view of an exemplary telecommunications tower in accordance with an embodiment of the present invention.
Figure 1B:
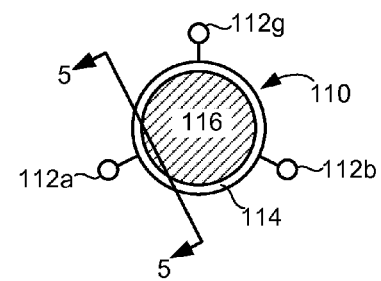
FIG. 1B depicts a top plan view of the telecommunications tower of FIG. 1A in accordance with an embodiment of the present invention.

Embodiments of the present invention are directed to raising and lowering telecommunications equipment on a telecommunications tower. An exemplary tower 110 is depicted in FIG. 1, which also depicts telecommunications equipment 112a-f. FIG. 1 is merely illustrative and the elements depicted in FIG. 1 might include a variety of different shapes, sizes and configurations. An alternative view of tower 110 is provided in FIG. 1B, which is a plan view of tower 110 looking down from above (i.e., provided from line 1B in FIG. 1A). FIG. 1B further includes equipment 112g.

Referring to FIGS. 1A and 1B, tower 110 includes a wall 114 that circumscribes a hollow interior space 116. In an embodiment of the present invention, the hollow interior space 116 extends from a bottom 118 of the tower to areas of the tower at which equipment 112a-g is positioned.

Equipment 112a-g might include a variety of telecommunications equipment. For example, equipment 112a-g might include an antenna, a radio, or a combination thereof. In this description, equipment 112a-g might also be referred to as "signaling components" or "signaling equipment."

Typically, equipment 112a-g is secured onto tower 110 at various heights to provide cellular telecommunications services to devices (e.g., mobile telecommunications devices) included within an area (e.g., cell). For example, equipment 112a-g might be used to send signals to mobile devices and/or to receive signals from mobile devices. Often a set of multiple components are located at a same height and on a same side of the tower. For example, equipment 112a might include a cluster of other telecommunications components (not shown) secured onto tower at a similar height as equipment 112a. Equipment secured onto tower 110 at a similar height is often referred to as a "rad center."

Tower 110 further comprises various openings 120a-120f that are provided for each cluster of components. Openings 120a-120f might be knockout openings constructed into circumscribing wall 114. Openings 120a-120f provide a passage through wall 114, such that components and equipment positioned in internal space 116 may pass through wall 114 to an external position. For example, hybrid cables (not shown in FIG. 1A or FIG. 1B) that provide power and data connections to components 112a-g might be run from the bottom 118, through interior space 116, and through openings 120a-f to connect to components 112a-g.

Equipment 112a-g might need to be serviced for various reasons. As such, in accordance with an embodiment of the present invention, a track is positioned in internal space 116 and extends from the bottom 118 to an operational position of equipment 112a-g. An "operational position" refers to a position at which a piece of telecommunications equipment is secured to facilitate the provision of telecommunications services to mobile devices. In an embodiment of the present invention, one operational position is on an external surface of wall 114, such that equipment 112a-g is positioned to face away from internal space 116.

Referring now to FIGS. 2A-2D, an exemplary track 210 is depicted in accordance with an embodiment of the present invention. FIGS. 2A-2D depict equipment 112a at different positions along track 210. For simplicity, FIGS. 2A-2D do not depict other equipment in addition to equipment 112a; however, in reality the tower 110 includes a variety of other equipment, such as 112b-112g.

FIG. 2A depicts equipment 112a at an operational position at which equipment 112a facilitates the provision of telecommunications services to mobile devices. FIGS. 2B-2D depict equipment 112a at various positions along track 210 between the operational position and a bottom of the tower. For example, FIG. 2B depicts equipment 112a passing through opening 120a, and FIG. 2C depicts equipment 112a positioned in interior space 116. In FIG. 2D, equipment 112a is depicted at a bottom 118 of tower 110, such as when equipment 112a is being serviced.

Equipment 112a includes a mount 212a that attaches to equipment 112a and to track 210. That is, mount 212a fixedly attaches to equipment 112a and enables equipment 112a to be moved along track 210. For example, mount 212a might include a wheel configuration, tread configuration, (or other rotating component) that allows equipment 112a to roll along track 210. Mount 212a might also include a slide configuration that allows equipment 112a to slide along track 210. In another embodiment, track 210 includes a conveying device, such as a belt or a chain. As such, mount 212a might fixedly attach to the conveying device, which transports equipment 212 between the operational position and the bottom of tower 110.

In an embodiment of the present invention, transportation of equipment 112a along track 210 is motorized. For example, mount 212a might include a motorized component that propels mount 212a along track 210. An example of motorized component that might be used to move mount 212a includes a motorized wheel configuration. Also, a movement of track 210 (e.g., moving chain or conveyer) might be motorized. As such, mount 212a, track 210, or both mount 212a and track 210 might be motorized.

In a further embodiment a controller 214 provides commands for transferring equipment 112a between the operational position and the bottom of tower 110. For example, controller 214 might include a first command that transports equipment 112a from the operational position to the bottom and a second command that transports equipment 112a from the bottom of tower 110 to the operational position. Controller 214 might provide commands to the motorized component(s) of mount 212a, track 210, or a combination thereof.

In another embodiment of the present invention, mount 212a is mountable at various positions on equipment 112a. For example, mount 212a might be attached to equipment 112a near a top, middle, or bottom of equipment 112a. Selection of a mounting position of mount 212a might be based on various factors, such as a width of interior space 116. For example, if interior space 116 is constructed to include a width that is less than the height of equipment 112a, then the mount might be attached to equipment 112a closer to a top of equipment 112a. In this example in which the interior space width is less than equipment height, by positioning mount 212a closer to the top of equipment 112a, equipment 112a will not impact an opposing wall of the interior space when equipment moves between a horizontal position in FIG. 2B and a vertical position in FIG. 2C.

As indicated in other portions of this description, a cable (e.g., hybrid cable) might extend to telecommunications equipment 112a-112g in order to provide power to, and exchange data with, equipment 112a-112g. Referring now to FIGS. 3A-3D, an illustration of a cable 310 is provided as equipment 112a is shown at different positions along track 210.

In an embodiment of the present invention, cable 310 is connectable to a cable reel 312, which might be arranged near the bottom of tower 110. For example, cable 312 might include a coupling that allows for connection to cable reel 312 when it is desired to transport equipment 112a on track 210. That is, it might not be necessary or desirable for cable 310 to be always attached to cable reel 312. In contrast, cable reel 312 might be positioned at bottom 118 of tower 110 when equipment 112a needs to be transported up or down tower 110. The coupling of cable 312 allows cable 312 to be selectively attached to cable reel 312.

In an embodiment of the present invention, cable reel 312 is rotatable, such that as equipment 112a moves towards cable reel 312, slack in cable 310 is wound around cable reel 312. Moreover, when equipment 112a is moved away from cable reel 312, the cable reel 312 can be turned to feed or payout cable 310. Cable reel 312 might be rotated using various components, such as a manually crank, a motor, or spring. When a motor is used to rotate cable reel 312, the motor might be coupled with controller 214, and movement of the mount 212a and/or track is synced with rotation of the cable reel 312.

Another embodiment of the present invention includes various components that provide a guide for, and retention, of cable 310 at various heights of tower 110. That is, as cable 310 extends through interior space 116, various components maintain a position of cable and support cable 310 to reduce the weight of cable 310 pulling downward on equipment 112a. For example, a conduit or other cable enclosure might extend along the tower wall and provide a partial or full encasement of cable 310. Such conduits and enclosures maintain a position of cable 310.

In addition, FIGS. 3A-3D illustrate a cable support 314 that provides a retention of cable 310 extending from equipment 112a. That is, cable support 314 helps to reduce a downward pull applied to equipment 112a by cable 310 extending from equipment 112a. For example, in FIG. 3D cable support 314 reduces a pull of cable 310 positioned beneath the cable support 314.

In one embodiment, cable support 314 includes a cable-support mount 316 that is securable to the tower 110. In addition, cable support 314 includes an extendable flexible member 318 that attaches to the mount 316 and that is attachable to the cable 310. The extendable flexible member 318 supports the cable 310 when the equipment 112a is transferred between the external position and the bottom of the hollow base structure. The extendable flexible member 318 might include various components. For example, extendable flexible member 318 might include an elastic member that stretches to support cable 310. In another embodiment, flexible member 318 is wound around a reel, which provides tension to counter-balance the weight of the cable 310. For example, the reel might be motorized or spring-loaded. Although only one cable support 314 is depicted in FIGS. 3A-3D, a plurality of cable supports might be positioned throughout the tower, and a various heights, to provide multiple retention components for cable 310.

In a further embodiment, cable-support 314 includes an attachment mechanism that attaches the flexible member 318 to the cable. For example, the attachment mechanism might include a clamp, tie, clip, or the like. In addition, cable 310 might be manufactured to include attachment points at various positions, such that the attachment mechanism might connect to the attachment points. For example, attachment loops or other structures might be constructed into a covering of cable 310.

Referring now to FIGS. 4A-4D, other embodiments of the present invention are illustrated, and FIGS. 4A-4D illustrate equipment 112a and cable 310 at various positions along track 210. As described with respect to FIGS. 3A-3D embodiments of the present invention include various components that provide a guide for and retention of cable 310. That is, as cable 310 extends through interior space 116 various components maintain a position of cable and support cable 310 to reduce the weight of cable 310 pulling downward on equipment 112a.

FIGS. 4A-4D illustrate a pulley 414 that is coupled to tower 110 and that supports cable 310. Although only a single pulley is depicted, multiple pulleys might be used in an embodiment of the present invention. Pulley 414 functions to support a weight of cable 310 and to provide a guide for cable 310. For example, as equipment 112a is positioned below pulley 414 in FIG. 4D, pulley 414 supports cable 310.

In a further embodiment, an end 311 of cable 310 is attachable to cable reel 312, which is illustrated near a bottom of tower 110, or is attachable to another flexible member 416 wound around cable reel 312. As such, the flexible member 416 and reel 312 function to payout slack to, and pull slack from, cable 310 when equipment 112a is transported along track 210 and cable 310 is supported by pulley 414. In a further embodiment reel 312 is controlled by controller 214 to payout and to wind cable clack in coordination with movement of equipment 112a along track 210.

In an alternative embodiment of the present invention, equipment 112a is attached to cable 310, which provides power, data, or a combination thereof. In addition, cable 310 and equipment 112a include mating docking components that are coupled to one another when equipment 112a is positioned in an operational position. That is, when equipment 112a is moved to an operational position, such as depicted in FIG. 3A, the docking components of equipment 112a and docking components of cable 310 become automatically coupled to facilitate transfer of power and data to equipment 112a. In addition, when it is desired to transport equipment 112a to a bottom of tower 110, the docking components are automatically decoupled, such that equipment 112a moves along track 210 without being attached to cable 310.

As described in other parts of this description, equipment 112a-g is secured onto tower 110 at various heights and is clustered into different rad centers. Referring back to FIG. 1, an embodiment of the present invention includes a first knockout opening 120a positioned at a first height of the hollow base structure and a second knockout opening 120c positioned at a second height of the hollow base structure between the first knockout opening and the bottom of the hollow base structure.

Figure 5A:
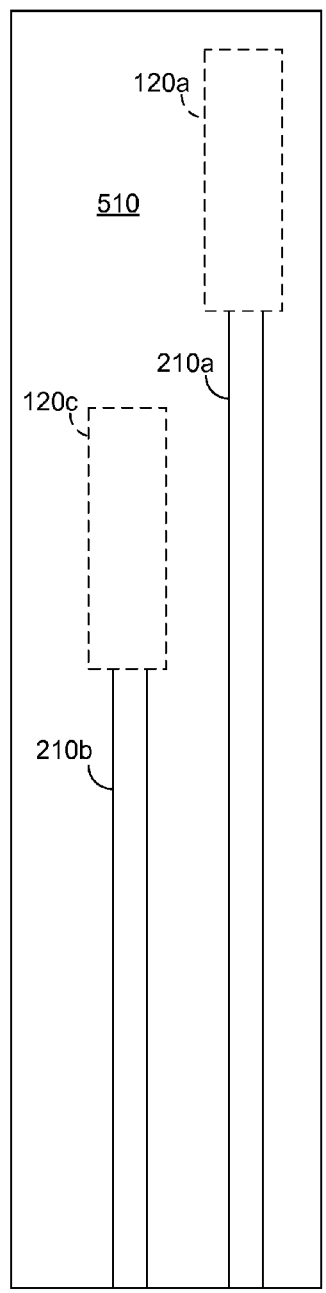
FIGS. 5A and 5B each depict an exemplary track structure in accordance with an embodiment of the present invention.
Figure 5B:
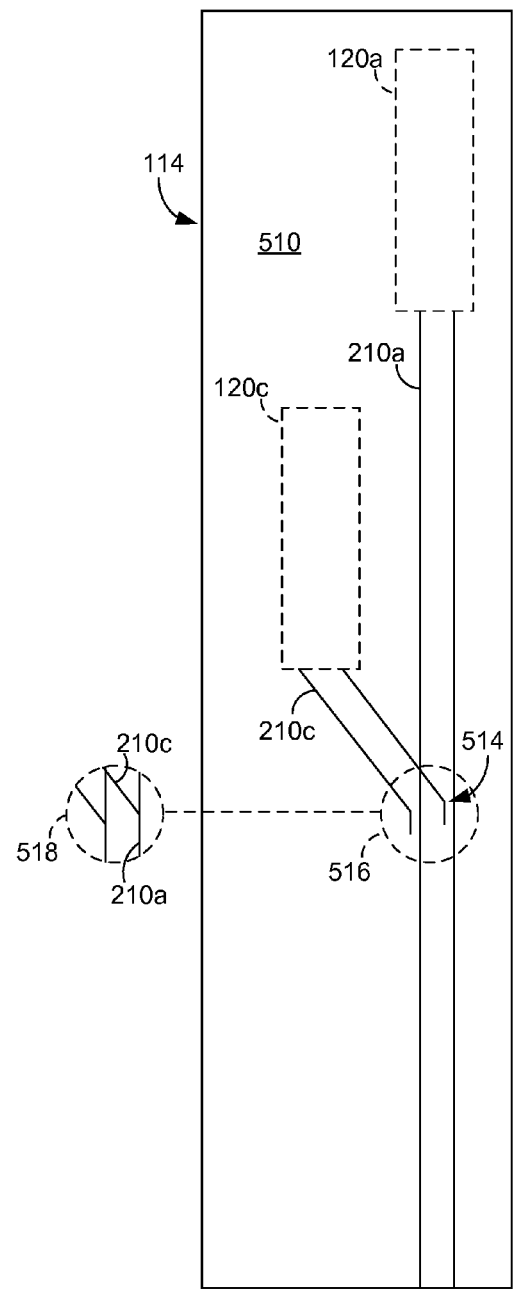

Various track configurations might be utilized to reach from the bottom 118 of tower 110 through each of the openings, and FIGS. 5A and 5B illustrate a couple of exemplary track configurations. FIGS. 5A and 5B each depict a respective embodiment of the present invention from a perspective of line 5 depicted in FIG. 1B. That is, FIGS. 5A and 5B provide a side plane view of an internal surface 510 of wall 114.

FIG. 5A illustrates one embodiment of the present invention that includes multiple, single-endpoint tracks. A single-endpoint track is a track that extends from a portion of the tower (e.g., the bottom) to a single opening. For example, track 210a is a single-endpoint track that extends from a region of the tower to opening 120a. Track 210b is a single-endpoint track that extends from a region of the tower to opening 120c.

FIG. 5B illustrates another embodiment of the present invention that includes a multi-endpoint track. A multi-endpoint track is a track that extends from a portion of the tower and that branches off to multiple endpoints. For example, track 210a extends from a portion of the tower (e.g., the bottom) to opening 120a. In addition, track 210c branches off of track 210a and extends to opening 120c. In another embodiment, a switch 514 is constructed on tracks 210a and 210c at the position at which track 210c branches off of track 210a. The switch 514 allows a path to be changed between opening 120a and opening 120c. For example, an open position of the switch is depicted inside circle 516, such that track 210c is not operationally connected to track 210a and the path of track 210a extends to opening 120a. In addition, a closed position of the switch is depicted inside circle 518, such that track 210c is operationally connected to track 210a and the path of track 210a extends to opening 120c. FIGS. 5A and 5B further depict that opening 120c might be offset from track 210a so as to avoid interference between track 210a and opening 120c.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system for raising and lowering a cellular-telecommunications signaling component on a cellular-telecommunications tower, the system comprising:
   a hollow base structure of the tower that includes a wall circumscribing an internal space and that is usable to support the signaling component at an external position on the hollow base structure;
   a first knockout opening and a second knockout opening that are constructed in the circumscribing wall and that are sized to allow passage of the signaling component from the external position into the internal space;
   a first track that extends inside the internal space from a bottom of the hollow base structure to the first knockout opening and a second track that merges off from the first track and extends inside the internal space to the second knockout opening, wherein the first and second tracks are is attachable to a mount of the signaling component to allow the signaling component to be transported along the first and the second tracks between the external position and the bottom of the hollow base structure; and
   a switch positioned at an interface between the first track and the second track, wherein the switch includes a first switch position that provides a path along the track from the bottom of the base structure to the first knockout opening and a second switch position that provides a path along the track and the second track from the bottom of the base structure to the second knockout opening.

2. The system of claim 1, wherein the first knockout opening is positioned at a first height of the hollow base structure and the second knockout opening is positioned at a second height of the hollow base structure between the first knockout opening and the bottom of the hollow base structure.

3. The system of claim 2, wherein the second knockout opening is laterally offset from the track.

4. The system of claim 1 further comprising, a cable support comprising:
   a cable-support mount securable to the tower, and
   an extendable flexible member that attaches to the mount and that is attachable to a cable of the signaling component, wherein the extendable flexible member supports the cable when the signaling component is transferred between the external position and the bottom of the hollow base structure.

5. The system of claim 4, wherein the extendable flexible member includes an elastic member that stretches when the cable is transported with the signaling component to the bottom of the hollow base structure.

6. The system of claim 4, wherein the extendable flexible member is wound around a reel and is unwound when the cable is transported with the signaling component to the bottom of the hollow base structure.

7. The system of claim 6, wherein the reel is spring-loaded.

8. The system of claim 6, wherein a rotation of the reel is controlled by a motor.

9. A system for raising and lowering a cellular-telecommunications signaling component on a cellular telecommunications tower, the system comprising:
- a track that that extends inside a tower internal space surrounded by a tower circumscribing wall and that extends from a bottom of the tower to one or more operational positions of one or more signaling components wherein the track includes a first track that extends from a bottom of the cellular telecommunications tower to a first operational position and a second track that merges off from the first track and extends to a second operational position;
- a signaling-component mount that is attachable to the signaling component and to the track and that is movable along the track between a first position at the bottom of the tower to a second position at the operational position of the signaling component;
- a controller in communication with the mount, the track, or a combination thereof, the controller including a first command for transferring the signaling-component mount from the first position to the second position and a second command for transferring the signaling-component mount from the second position to the first position; and
- a switch positioned at an interface between the first track and the second track, wherein the switch includes a first switch position that provides a path along the track from the bottom to the first operational position and a second switch position that provides a path along the track from the bottom to the second operational position.

10. The system of claim 9 further comprising, a cable reel positioned at the bottom of the tower, wherein the cable reel is controllable by the controller to rotate in a first direction in coordination with the first command and in a second direction in coordination with the second command.

11. The system of claim 10, wherein the cable reel is attachable to a signaling-component cable that extends from the bottom of the tower to the signaling component.

12. The system of claim 11, wherein the cable reel winds the signaling-component cable when the signaling-component mount is transferred from the second position to the first position.

13. The system of claim 11, wherein the cable reel comprises a flexible member that attaches to the signaling-component cable, and wherein cable reel rotates to unwind the flexible member when the signaling-component mount is transferred from the second position to the first position.

14. A system for raising and lowering a cellular-telecommunications signaling component on a cellular telecommunications tower, the system comprising:
- a hollow base structure of the tower including a wall circumscribing an internal space and an opening that is constructed in the circumscribing wall;
- a track that extends inside the internal space from a bottom of the hollow base structure and through the opening;
- a signaling-component mount that is attachable to the signaling component and to the track and that is movable along the track between a first position at the bottom of the tower and a second position on an outside surface of the tower, the signaling component being movable through the opening of the tower when moving between the first position and the second position;
- a controller in communication with the mount, the track, or a combination thereof, the controller including a first command for transferring the signaling-component mount from the first position to the second position and a second command for transferring the signaling-component mount from the second position to the first position; and
- a cable-support mechanism that is configured to support a signaling-component cable, which provides power and data to the signaling component, and that includes:
  - a tension-providing reel coupled near the opening, and
  - an extendible flexible member attached to the tension-providing reel and attachable to the signaling-component cable, the extendible flexible member supporting the signaling-component cable as the signaling component is lowered from near the opening towards the bottom.

15. The system of claim 14 further comprising, a cable reel positioned at the bottom of the hollow base structure, wherein the cable reel is controllable by the controller to rotate in a first direction in coordination with the first command and in a second direction in coordination with the second command.

16. The system of claim 14 further comprising, a first opening positioned at a first height of the hollow base structure and a second opening positioned at a second height of the hollow base structure between the first opening and the bottom of the hollow base structure, wherein the track extends to the first opening and wherein a second track extends to the second opening.

* * * * *